United States Patent
Bindal et al.

(10) Patent No.: US 10,061,856 B2
(45) Date of Patent: Aug. 28, 2018

(54) MULTIMEDIA SEARCH USING RESHARE TEXT ON ONLINE SOCIAL NETWORKS

(71) Applicant: Facebook, Inc., Menlo Park, CA (US)

(72) Inventors: Anuj Bindal, Sunnyvale, CA (US); Maxime Boucher, Mountain View, CA (US); Sahil P. Thaker, San Jose, CA (US); Mahsa Ghafourian, Palo Alto, CA (US); Arpit Suresh Jain, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 439 days.

(21) Appl. No.: 14/609,084

(22) Filed: Jan. 29, 2015

(65) Prior Publication Data

US 2016/0224672 A1    Aug. 4, 2016

(51) Int. Cl.
*G06F 17/30* (2006.01)

(52) U.S. Cl.
CPC .... *G06F 17/30867* (2013.01); *G06F 17/3053* (2013.01); *G06F 17/30528* (2013.01); *G06F 17/30554* (2013.01)

(58) Field of Classification Search
CPC ................................................. G06F 17/30528
USPC ......................................................... 707/723
See application file for complete search history.

(56) References Cited

U.S. PATENT DOCUMENTS

| | | | |
|---|---|---|---|
| 5,918,014 A | 6/1999 | Robinson | |
| 6,539,232 B2 | 3/2003 | Hendrey | |
| 6,957,184 B2 | 10/2005 | Schmid | |
| 7,069,308 B2 | 6/2006 | Abrams | |
| 7,379,811 B2 | 5/2008 | Rasmussen | |
| 7,539,697 B1 | 5/2009 | Akella | |
| 7,752,326 B2 | 7/2010 | Smit | |
| 7,836,044 B2 | 11/2010 | Kamvar | |
| 8,027,990 B1 | 9/2011 | Mysen | |
| 8,060,639 B2 | 11/2011 | Smit | |
| 8,112,529 B2 | 2/2012 | Van Den Oord | |
| 8,180,804 B1 | 5/2012 | Narayanan | |
| 8,185,558 B1 | 5/2012 | Narayanan | |
| 8,239,364 B2 | 8/2012 | Wable | |
| 8,244,848 B1 | 8/2012 | Narayanan | |
| 8,271,471 B1 | 9/2012 | Kamvar | |
| 8,271,546 B2 | 9/2012 | Gibbs | |
| 8,301,639 B1 | 10/2012 | Myllymaki | |
| 8,321,364 B1 | 11/2012 | Gharpure | |
| 8,364,709 B1 | 1/2013 | Das | |
| 8,386,465 B2 | 2/2013 | Ansari | |

(Continued)

FOREIGN PATENT DOCUMENTS

WO    WO 2014002004 A1 *    1/2014    .......    G06F 17/30846

*Primary Examiner* — Cam-Linh Nguyen
(74) *Attorney, Agent, or Firm* — Baker Botts L.L.P.

(57) ABSTRACT

In one embodiment, a method includes receiving a search query for multimedia objects of an online social network from a user of the online social network; searching an index of multimedia objects to identify multimedia objects indexed with keywords that match n-grams of the search query, the keywords having been extracted from reshares associated with the multimedia objects; calculating an object-score for each identified multimedia object based on social signals; generating search results with references to the identified multimedia objects that have an object-score greater than a threshold object-score; and sending to the user one or more of the search results as part of a search-results page.

34 Claims, 8 Drawing Sheets

(56) References Cited

U.S. PATENT DOCUMENTS

| | | |
|---|---|---|
| 8,407,200 B2 | 3/2013 | Wable |
| 8,412,749 B2 | 4/2013 | Fortuna |
| 8,538,960 B2 | 9/2013 | Wong |
| 8,572,129 B1 | 10/2013 | Lee |
| 8,595,297 B2 | 11/2013 | Marcucci |
| 8,601,027 B2 | 12/2013 | Behforooz |
| 8,639,725 B1 | 1/2014 | Udeshi |
| 8,732,208 B2 | 5/2014 | Lee |
| 8,751,521 B2 | 6/2014 | Lee |
| 8,782,080 B2 | 7/2014 | Lee |
| 8,868,603 B2 | 10/2014 | Lee |
| 8,918,418 B2 | 12/2014 | Lee |
| 8,935,255 B2 | 1/2015 | Sankar |
| 8,935,271 B2 | 1/2015 | Lassen |
| 9,288,123 B1* | 3/2016 | Safford .................. G06Q 50/01 |
| 9,324,112 B2* | 4/2016 | Bailey ............... G06F 17/30867 |
| 9,450,771 B2* | 9/2016 | Browning ........... H04L 12/1831 |
| 9,619,481 B2* | 4/2017 | Biswas ............. G06F 17/30165 |
| 2002/0086676 A1 | 7/2002 | Hendrey |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0215793 A1 | 10/2004 | Ryan |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0136419 A1 | 6/2006 | Brydon |
| 2006/0190436 A1 | 8/2006 | Richardson |
| 2007/0277100 A1 | 11/2007 | Sheha |
| 2008/0033926 A1 | 2/2008 | Matthews |
| 2008/0072180 A1 | 3/2008 | Chevalier |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0094200 A1 | 4/2009 | Baeza-Yates |
| 2009/0164929 A1 | 6/2009 | Chen |
| 2009/0197681 A1 | 8/2009 | Krishnamoorthy |
| 2009/0228296 A1 | 9/2009 | Ismalon |
| 2009/0265326 A1 | 10/2009 | Lehrman |
| 2009/0281988 A1 | 11/2009 | Yoo |
| 2009/0299963 A1 | 12/2009 | Pippori |
| 2010/0049802 A1 | 2/2010 | Raman |
| 2010/0057723 A1 | 3/2010 | Rajaram |
| 2010/0125562 A1 | 5/2010 | Nair |
| 2010/0179929 A1 | 7/2010 | Yin |
| 2010/0197318 A1 | 8/2010 | Petersen |
| 2010/0228744 A1 | 9/2010 | Craswell |
| 2010/0235354 A1 | 9/2010 | Gargaro |
| 2010/0321399 A1 | 12/2010 | Ellren |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0191371 A1 | 8/2011 | Elliott |
| 2011/0196855 A1* | 8/2011 | Wable ............... G06F 17/30631 707/711 |
| 2011/0276396 A1 | 11/2011 | Rathod |
| 2011/0313992 A1 | 12/2011 | Groeneveld |
| 2011/0320470 A1 | 12/2011 | Williams |
| 2012/0059708 A1 | 3/2012 | Galas |
| 2012/0136852 A1 | 5/2012 | Geller |
| 2012/0166432 A1 | 6/2012 | Tseng |
| 2012/0166433 A1 | 6/2012 | Tseng |
| 2012/0179637 A1 | 7/2012 | Juan |
| 2012/0185486 A1 | 7/2012 | Voigt |
| 2012/0209832 A1 | 8/2012 | Neystadt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284249 A1* | 11/2012 | Ahmed ............. G06F 17/30867 707/706 |
| 2012/0284329 A1 | 11/2012 | Van Den Oord |
| 2012/0311034 A1 | 12/2012 | Goldband |
| 2012/0331063 A1 | 12/2012 | Rajaram |
| 2013/0031106 A1 | 1/2013 | Schechter |
| 2013/0036169 A1* | 2/2013 | Quigley ................ G06Q 50/01 709/204 |
| 2013/0041876 A1 | 2/2013 | Dow |
| 2013/0066876 A1 | 3/2013 | Raskino |
| 2013/0086057 A1 | 4/2013 | Harrington |
| 2013/0110827 A1* | 5/2013 | Nabar .................... G06Q 10/00 707/728 |
| 2013/0124538 A1 | 5/2013 | Lee |
| 2013/0124542 A1 | 5/2013 | Lee |
| 2013/0144899 A1 | 6/2013 | Lee |
| 2013/0191372 A1 | 7/2013 | Lee |
| 2013/0191416 A1 | 7/2013 | Lee |
| 2013/0198219 A1 | 8/2013 | Cohen |
| 2013/0226918 A1 | 8/2013 | Berkhim |
| 2013/0246404 A1 | 9/2013 | Annau |
| 2015/0025977 A1* | 1/2015 | Doyle .................... G06Q 50/01 705/14.66 |
| 2015/0066689 A1* | 3/2015 | Astore .................. G06Q 50/01 705/26.8 |

* cited by examiner

*Post Index*

| Post | Keywords | Objects | No. of likes | No. of reshares | No. of comments |
|---|---|---|---|---|---|
| Post 1 | k1, k2, k3 | Link 1 | 3 | 2 | 2 |
| Post 2 | k4, k5, k6 | Link 1 | 2 | 0 | 3 |
| Post 3 | k7, k8, k9 | Link 2, Link 3 | 40 | 21 | 700 |

*FIG. 6A*

*Multimedia Index*

| Link | Posts | Keywords | No. of likes | No. of reshares | No. of comments |
|---|---|---|---|---|---|
| Link 1 | Post 1 | k1, k2, k3 | 8 | 2 | 5 |
| Link 2 | Post 2, Post 3 | k4, k5, k6, k7 | 7 | 0 | 4 |
| Link 3 | Post 1, Post 2, Post 4 | k1, k2, k4, k5, k8 | 39 | 7 | 40 |

*FIG. 6B*

*Keyword Index*

| Keyword | Links | Posts | No. of likes | No. of reshares | No. of comments |
|---|---|---|---|---|---|
| k1 | Link 1 | Post 1 | 2 | 3 | 3 |
|  | Link 2 | Post 2 | 3 | 2 | 3 |
| k2 | Link 1 | Post 1, Post 3 | 1 | 1 | 5 |
|  | Link 2 | Post 2 | 5 | 0 | 7 |
| k3 | Link 3, Link 4 | Post 3 | 6 | 0 | 3 |

MULTIMEDIA SEARCH USING RESHARE TEXT ON ONLINE SOCIAL NETWORKS

TECHNICAL FIELD

This disclosure generally relates to social graphs and performing searches for objects within a social-networking environment.

BACKGROUND

A social-networking system, which may include a social-networking website, may enable its users (such as persons or organizations) to interact with it and with each other through it. The social-networking system 160 may, with input from a user, create and store in the social-networking system a user profile associated with the user. The user profile may include demographic information, communication-channel information, and information on personal interests of the user. The social-networking system 160 may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system 160 may send over one or more networks content or messages related to its services to a mobile or other computing device of a user. A user may also install software applications on a mobile or other computing device of the user for accessing a user profile of the user and other data within the social-networking system. The social-networking system 160 may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, the social-networking system 160 may, in response to a search query for multimedia objects, search an index of multimedia objects to identify multimedia objects responsive to the search query. The index of multimedia objects may include the multimedia objects indexed with one or more keywords associated with the multimedia objects (e.g., text from posts, reshares, comments, or messages linking the multimedia objects). The index of multimedia objects may be created by accessing posts, reshares, comments, or messages on the online social network and may be a post index (a forward index), a multimedia index (an inverted index), or a keyword index (an inverted index). The social-networking system 160 may identify multimedia objects responsive to the search query by matching n-grams from the search query with the keywords associated with the multimedia objects. The social-networking system 160 may then calculate an object-score for each identified multimedia object based at least in part on social signals associated with the multimedia object. The social-networking system 160 may also calculate a post-score to be associated with posts or reshares that include multimedia objects, calculating the post-score using similar bases as the object-score associated with identified multimedia objects. The social-networking system 160 may then generate search results that include references to the identified multimedia objects having an object-score greater than a threshold object-score and may subsequently send one or more of the search results as part of a search-results page. The generated search results may be displayed in an order based on the object-score of their corresponding multimedia objects or the post-score (if applicable).

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 6A, 6B, and 6C illustrate examples of a post index, a multimedia index, and a keyword index, respectively.

DESCRIPTION OF EXAMPLE EMBODIMENTS

System Overview

Figure 1:
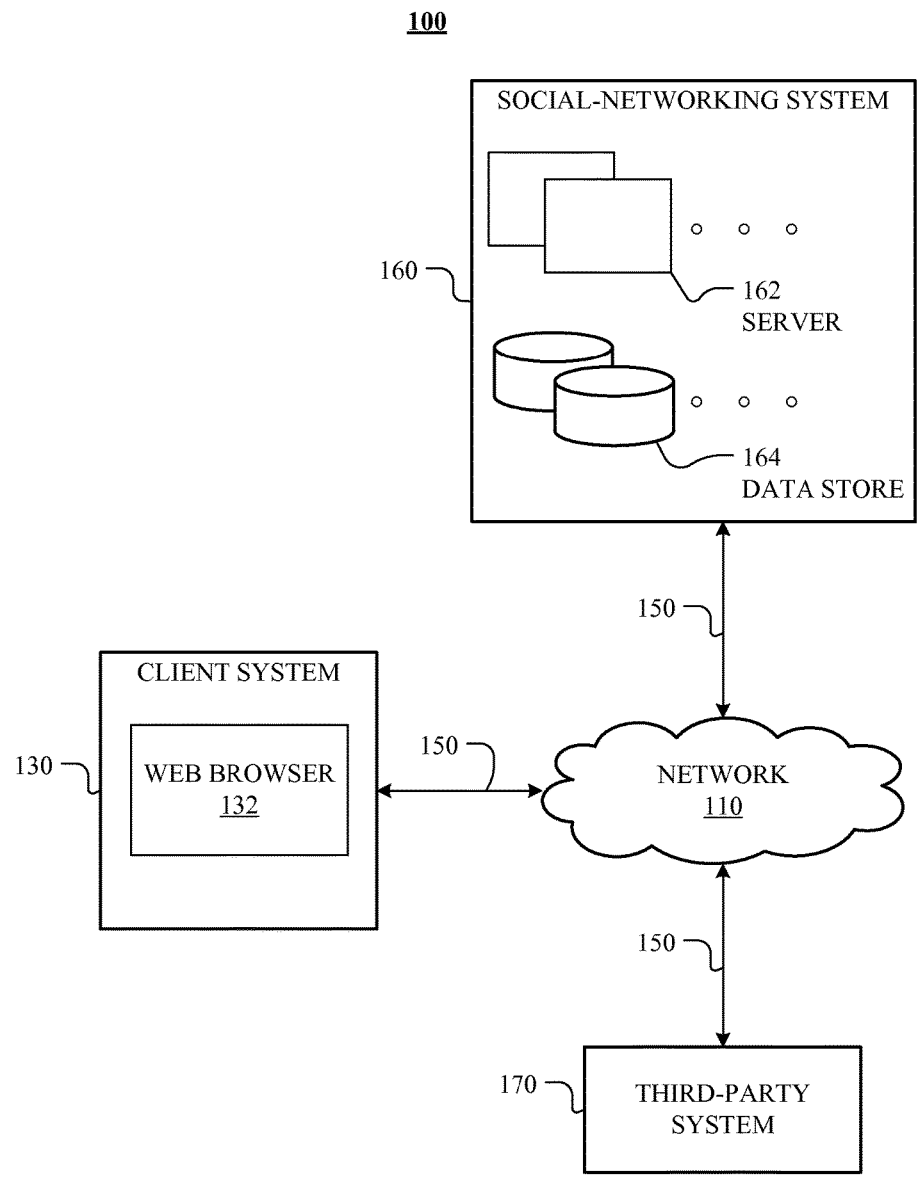
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via social-networking system 160.

In particular embodiments, the social-networking system 160 may provide users with the ability to take actions on various types of items or objects, supported by social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party system 170 via network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by the social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
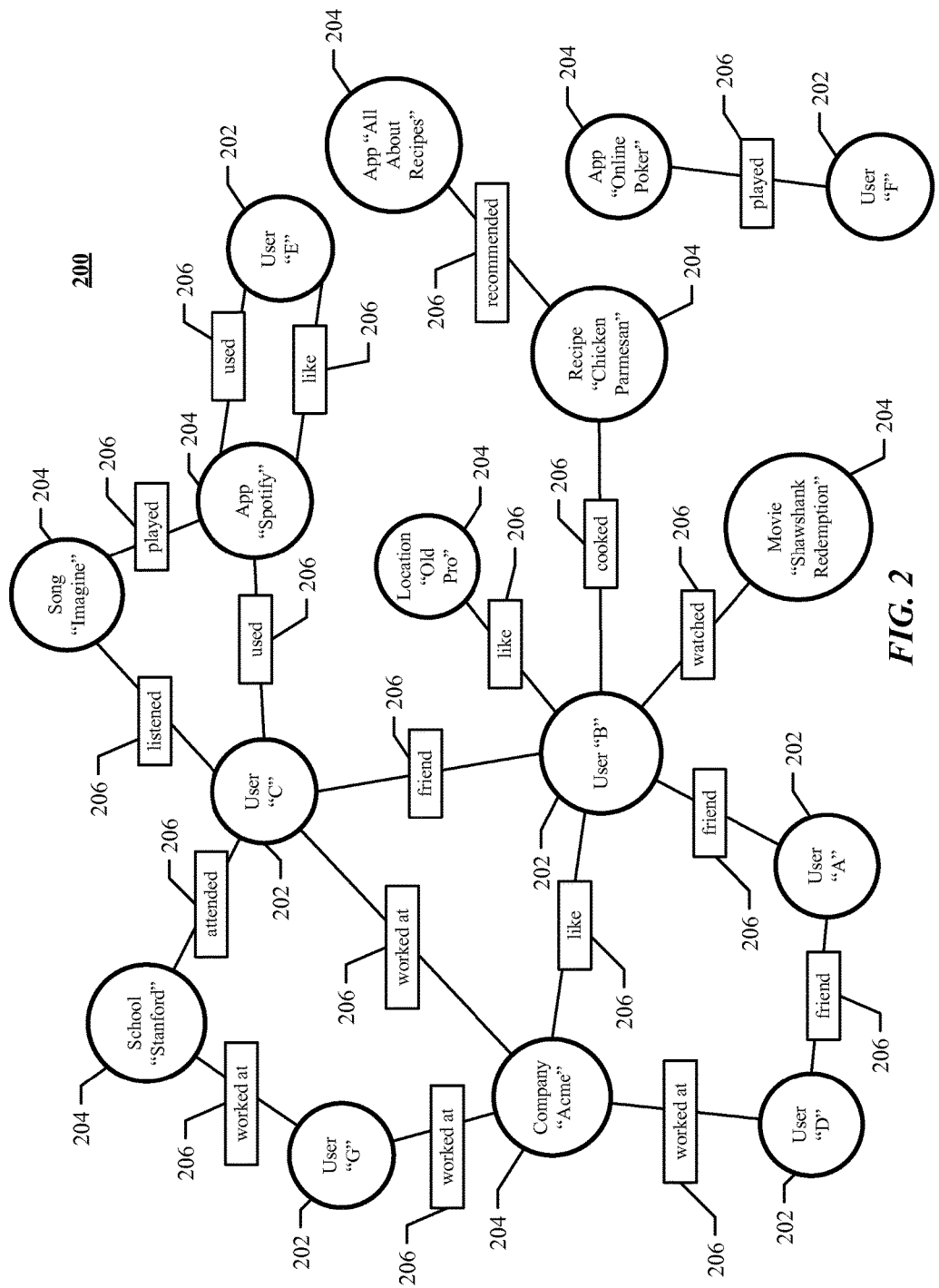
FIG. 2 illustrates an example social graph.

FIG. 2 illustrates example social graph 200. In particular embodiments, the social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile page. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Search Queries on Online Social Networks

In particular embodiments, a user may submit a query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile pages, content-profile pages, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile pages, external webpages, or any combination thereof. The social-networking system 160 may then generate a search-results page with search results corresponding to the identified content and send the search-results page to the user. The search results may be presented to the user, often in the form of a list of links on the search-results page, each link being associated with a different page that contains some of the identified resources or content. In particular embodiments, each link in the search results may be in the form of a Uniform Resource Locator (URL) that specifies where the corresponding page is located and the mechanism for retrieving it. The social-networking system 160 may then send the search-results page to the web browser 132 on the user's client system 130. The user may then click on the URL links or otherwise select the content from the search-results page to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested page (such as, for example, a user-profile page, a concept-profile page, a search-results page, a user interface of a native application associated with the online social network, or another suitable page of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile pages and respective user nodes 202 or concept nodes 204, such as a profile page named or devoted to "poker" or "pokemon," which the user can then click on or otherwise select thereby confirming the desire to declare the matched user or concept name corresponding to the selected node.

More information on typeahead processes may be found in U.S. patent application Ser. No. 12/763162, filed 19 Apr. 2010, and U.S. patent application Ser. No. 13/556072, filed 23 Jul. 2012, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile pages and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges.

Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503093, filed 11 Aug. 2006, U.S. patent application Ser. No. 12/977027, filed 22 Dec. 2010, and U.S. patent application Ser. No. 12/978265, filed 23 Dec. 2010, which are incorporated by reference.

Structured Search Queries

In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556072, filed 23 Jul. 2012, U.S. patent application Ser. No. 13/731866, filed 31 Dec. 2012, and U.S. patent application Ser. No. 13/732101, filed 31 Dec. 2012, each of which is incorporated by reference. More information on structured search queries and grammar models may be found in U.S. patent application Ser. No. 13/556072, filed 23 Jul. 2012, U.S. patent application Ser. No. 13/674695, filed 12 Nov. 2012, and U.S. patent application Ser. No. 13/731866, filed 31 Dec. 2012, each of which is incorporated by reference.

Generating Keywords and Keyword Queries

In particular embodiments, the social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, and as described further below, if a user types the query "friends stan," then the social-networking system 160 may suggest, for example, "friends stanford," "friends stanford university," "friends stanley," "friends stanley cooper," "friends stanley kubrick," "friends stanley cup," and "friends stanlonski." In this example, the social-networking system 160 is suggesting the keywords which are modifications of the ambiguous n-gram "stan," where the suggestions may be generated from a variety of keyword generators. The social-networking system 160 may have selected the keyword completion suggestions because the user is connected in some way to the suggestions. As an example and not by way of limitation, the querying user may be connected within the social graph 200 to the concept node 204 corresponding to Stanford University, for example by like- or attended-type edges 206. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244748, filed 3 Apr. 2014, U.S. patent application Ser. No. 14/470607, filed 27 Aug. 2014, and U.S. patent application Ser. No. 14/561418, filed 5 Dec. 2014, each of which is incorporated by reference.

Multimedia Search

Figure 3:
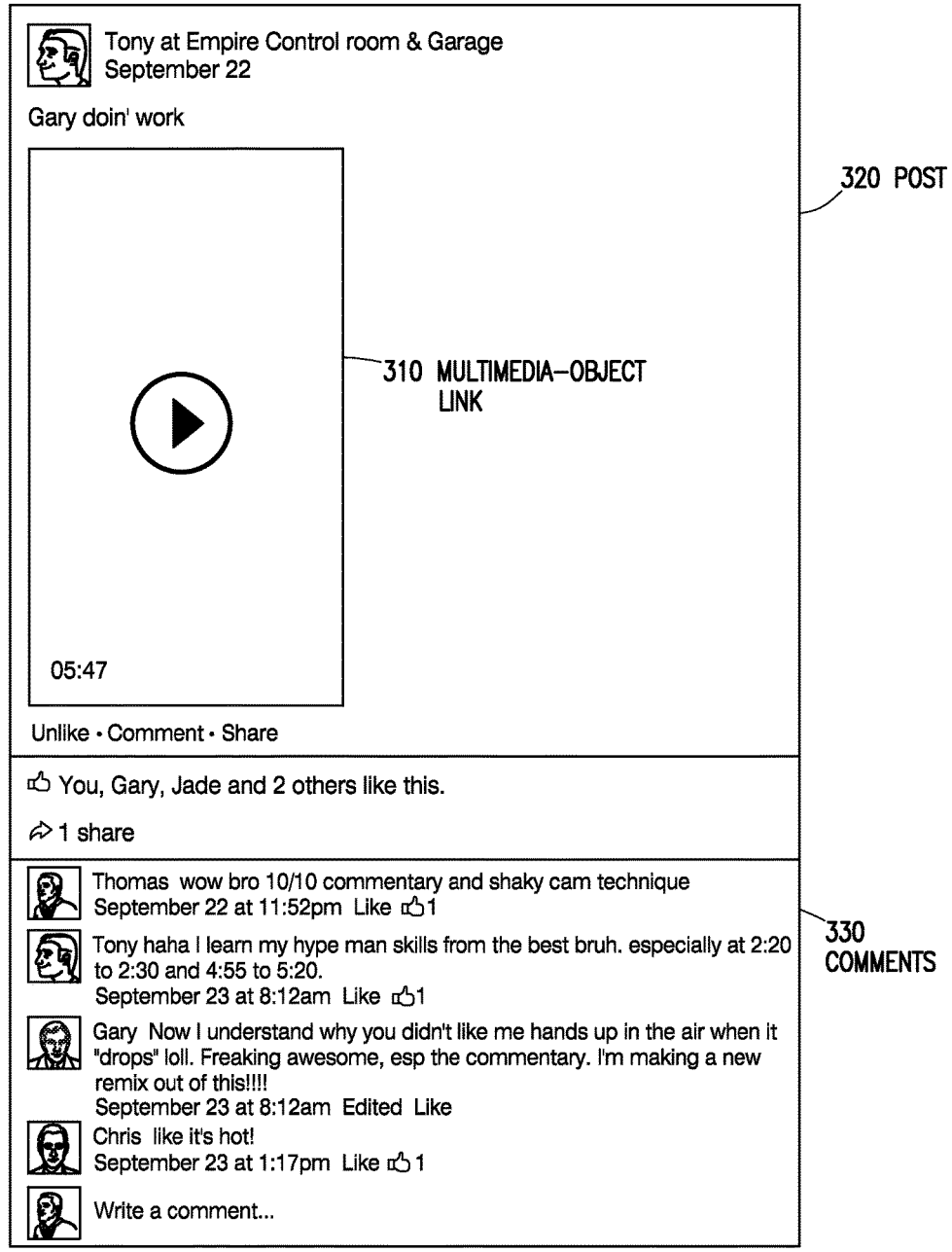
FIG. 3 illustrates an example of a post linking to a multimedia object existing natively on an online social network.
Figure 4:
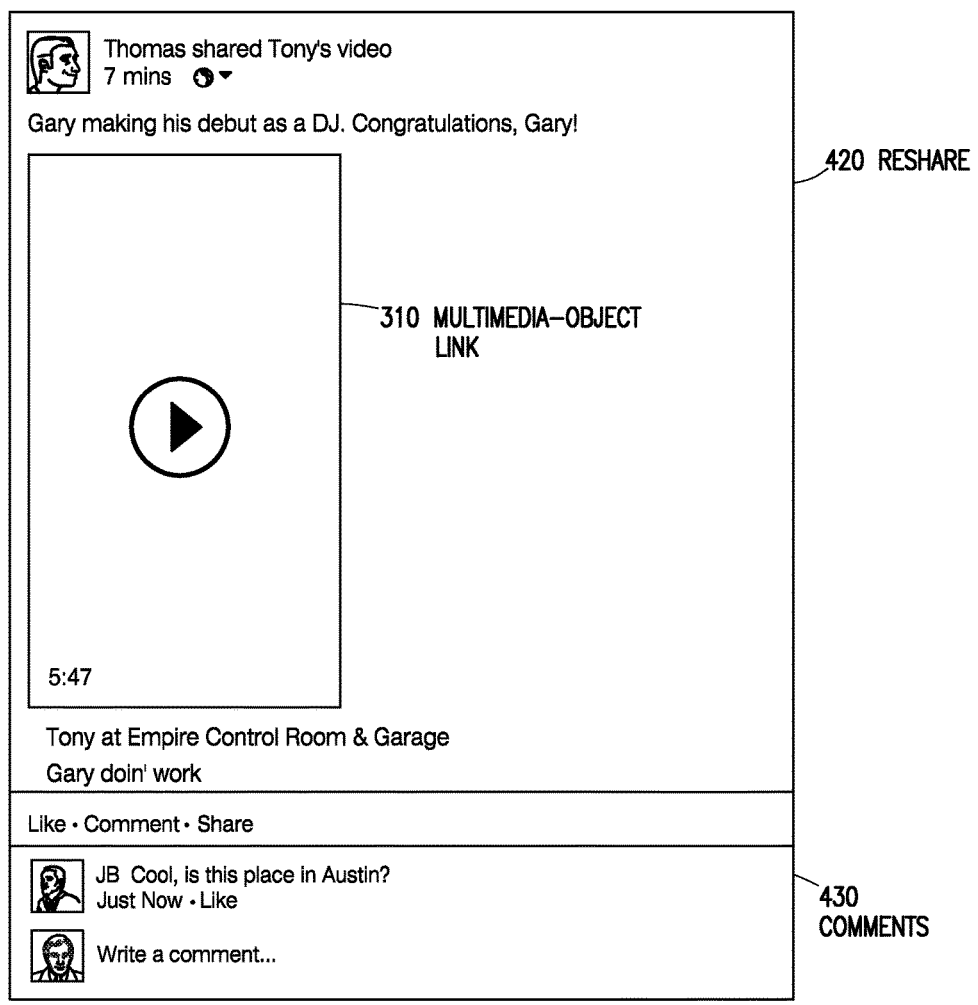
FIG. 4 illustrates an example of a reshare linking to a multimedia object existing natively on an online social network.
Figure 5A:
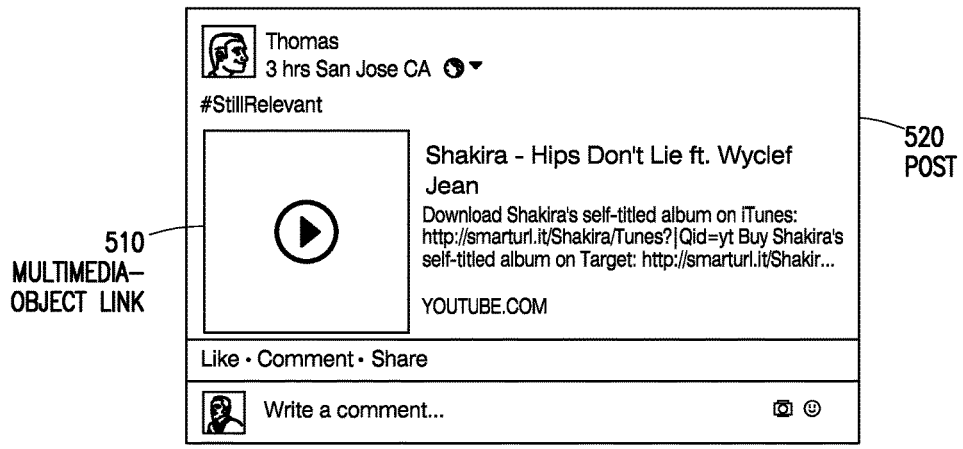
FIG. 5A illustrates an example of a post linking to a multimedia object on a third-party website.
Figure 5B:
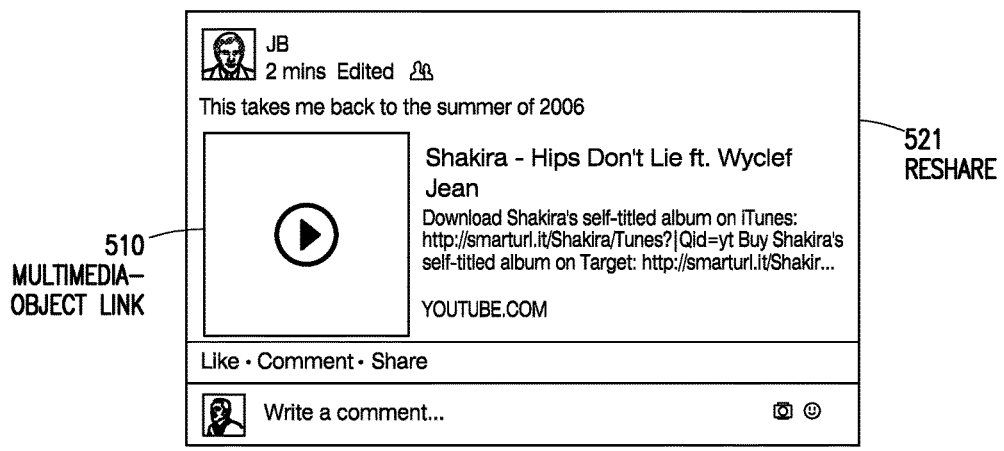
FIG. 5B illustrates an example of a reshare linking to a multimedia object on a third-party website.

FIGS. 3 and 4 illustrate examples of a post and a reshare, respectively, of the online social network, each linking to a multimedia object existing natively on the online social network. FIGS. 5A and 5B illustrate examples of a post and a reshare, respectively, of the online social network, each linking to a multimedia object on a third-party website (e.g., a video distribution/publishing website). When a user posts a link to a multimedia object (e.g., a video link), the social-networking system 160 may extract text associated with the multimedia object (e.g., text in the post, the title of the multimedia object, text from the blurb generated by embedding the link in the post, etc.) as keywords. The social-networking system 160 may then index the multimedia object with its respective keywords, so that a user may be able to search for and find specific multimedia objects based on the keywords. The problem is that posts linking to multimedia objects often do not include useful or descriptive text (i.e., text that describes the substance of the multimedia object itself) that the average user may search for when searching for a multimedia object. This is particularly true of posts with links that are native embedded multimedia objects of an online social network, because such posts and objects often have no title or description associated with them at all (e.g., a post containing a video of a cat may be titled simply "LOL"). However, in reshares of posts, people often include descriptive text about what it is they are resharing (e.g., "Check out this video of my friend's cat playing a piano!"). Consequently, it may be particularly useful to extract text from reshares of posts linking to multimedia objects, and to index the multimedia objects with their respective keywords extracted from these reshares. In particular embodiments, the social-networking system 160 may receive a search query for multimedia objects from a user and, in response, search an index of multimedia objects to identify multimedia objects based on the search query. The social-networking system 160 may then generate and send search results to the user that include references to the identified multimedia objects. Although this disclosure focuses on search queries that are keyword search queries, this disclosure contemplates search queries of any suitable type (e.g., structured search queries). The term "post" as used herein may include a publication that contains multimedia content on an online social network by a user, where the publication does not reference another publication on the online social network. The term "reshare" as used herein may include a publication that contains multimedia content on an online social network by a user, where the publication references another publication on the online social network (for example, a post may be linked to or embedded in the reshare). A publication may include a post, reshare, or comment made by a user on a newsfeed page or homepage of the online social network, on a user's own page of the online social network (e.g., the user's timeline or wall), on the page of the user's online-social-network connection (e.g., a timeline or wall of the user's first-degree connection or "friend"), on the page of a group on the online social network (e.g., a timeline or wall of a group related to a hobby), or on another suitable page of the online social network. The term "message" as used herein may include a message sent between two or more users in a messaging application associated with the online social network. The terms "link to the multimedia object" or "multimedia-object link" are used interchangeably herein and may refer to either a multimedia object that exists natively on the online social network or to a multimedia object that exists on a third-party website. Such a link may include a URL or URI (which may include deep links to apps), an embedded object, or any other suitable reference. Although this disclosure describes identifying particular objects based on a search query in a particular manner, this disclosure contemplates identifying any suitable objects in any suitable manner.

In particular embodiments, the social-networking system 160 may receive a search query to search for multimedia objects of an online social network from a client system 130 of a user of the online social network. The search query may include one or more n-grams. As an example and not by way of limitation, the search query may be typed into a search field on a page of the online social network by the user. The social-networking system 160 may receive the search query upon a confirmation input by the user (e.g., the pressing of the enter key, the clicking of a "search" button). Alternatively, the social-networking system 160 may automatically receive the search query in real-time as the user types text into a search field without the need for any further confirmation input from the user. As an example and not by way of limitation, the social-networking system 160 may receive multiple search queries as a user types "gary dj debut" into a search field. For example, when the user finishes typing "gary," the social-networking system 160 may receive a search query including the text "gary"; when the user finishes typing "gary dj," the social-networking system 160 may receive a search query including the text "gary dj"; when the user finishes typing "gary dj de," the social-networking system 160 may receive a search query including the text "gary dj de." In particular embodiments, the social-networking system 160 may receive keyword completion suggestions (generated by way of the same process described above) as search queries. As an example and not by way of limitation, when the user finishes typing "gary dj de," the social-networking system 160 may receive search queries for "gary dj debut" and "gary dj destroys" (where the text in bold indicates the keyword suggestions appended to the user's initial text input). In particular embodiments, the social-networking system 160 may receive a keyword search query from a user (e.g., a search query that includes distinct n-grams that are to be searched for). For example, a user may enter into a search field the text "gary dj debut," which may include the following n-grams: "gary," "gary dj," "gary dj debut," "dj," "dj debut," and "debut." In particular embodiments, the social-networking system 160 may receive a structured query. As an example and not by way of limitation, the social-networking system 160 may receive a search query such as "Videos of my friends named Gary" upon user entry of the text "gary video" (alternatively, the structured query may be sent to the user as a suggestion which may then be confirmed by the user). Although this disclosure describes receiving a particular search query to search for particular objects in a particular manner, this disclosure contemplates receiving any suitable search query to search for any suitable objects in any suitable manner.

In particular embodiments, the social-networking system 160 may search an index of multimedia objects to identify one or more multimedia objects based on the search query. The index of multimedia objects may be an index of a plurality of multimedia objects that includes one or more keywords associated with each multimedia object. The keywords may be extracted from one or more posts, reshares, comments, or messages (e.g., messages sent between two or more users in a messaging application associated with the social-networking system 160) associated with a multimedia object (e.g., from a post, reshare, comment, or message that links to the multimedia object). The posts, reshares, comments, or messages may be made by other users of the online social network, or by the user sending the search query from the client system 130. Each of the identified multimedia objects may have been indexed with one or more keywords substantially matching the one or more n-grams of the search query. In particular embodiments, in searching the index of multimedia objects, the social-networking system 160 may first access the index of multimedia objects which may include a plurality of entries. The index may be a post index (a forward index), a multimedia index (an inverted index), or a keyword index (an inverted index). Each entry may include a multimedia object (or a link to the multimedia object) and the one or more keywords associated with the multimedia object, along with associated social signal counts such as the number of associated views, reshares, likes, or comments (see below) within the online social network or on third-party websites. The social-networking system 160 may then identify one or more multimedia objects based on matching the one or more n-grams of the search query with the one or more keywords associated with the multimedia objects (e.g., by comparing the characters of the keywords with the characters of the n-grams). As an example and not by way of limitation, the social-networking system 160 may, upon receiving a search query for "gary dj debut," access an index of multimedia objects to find keywords substantially matching one or more n-grams of the search query such as the n-grams "gary," "dj," and "debut." The social-networking system 160 may identify one or more multimedia objects that are indexed with the keywords "gary," "dj," "debut," or any combination thereof, so indexed because the keywords were present in and extracted from posts, reshares, comments, or messages associated with the multimedia objects. Keywords may be extracted from posts, reshares, comments, or messages using any suitable techniques, such as, for example, scrapping, text grepping, expression matching, parsing, other suitable techniques, or any combination thereof. As an example and not by way of limitation, referencing FIG. 4, the multimedia object corresponding to the multimedia-object link 310 (i.e., an embedded video) may be indexed with, among other keywords, keywords extracted from the text of the reshare 420 (e.g., the keywords "gary," "dj," and "debut" extracted from the text "Gary making his debut as a DJ . . . . "). If a user enters "gary dj" as a search query, the social-networking system 160 may identify the multimedia object corresponding to the multimedia-object link 310 based on the match between the n-grams of the search query and the keywords associated with that multimedia object (e.g., "gary" and "dj"). As another example and not by way of limitation, referencing FIG. 3, the multimedia-object link 310 may be indexed with keywords extracted from the text of the post 320 (e.g., "Gary doin' work"). In particular embodiments, the index may include keywords extracted from metadata associated with a linked multimedia object (e.g., blurbs and titles associated with the multimedia object that may exist natively on the online social network or on third-party websites) or metadata associated with a post, reshare, the comments thereof, or messages (e.g., a time or date stamp of a post/reshare/comment, a location from which a post/reshare/comment was uploaded, a location tagged in a post/reshare/comment, an author name for a post/reshare/comment). As an example and not by way of limitation, referencing FIGS. 5A-5B, the index may include keywords extracted from the title of the video referenced by the multimedia-object link 510 (e.g., "Shakira-Hips Don't Lie ft. Wyclef Jean"). In particular embodiments, the social-networking system 160 may identify a multimedia object that is indexed with one or more keywords that are associated with topics shared in common with one or more of the n-grams of the search query. As an example and not by way of limitation, referencing FIG. 4, the social-networking system 160 may, in response to a search query including the n-gram "texas," identify the multimedia object linked by the multimedia-object link 310 partly because the object may be indexed with the keyword "austin" (which refers to the capital of Texas and would therefore have "Texas" as a topic in common) which may have been extracted from the comments. More information on how keywords and n-grams are associated with topics, and on topic association generally, may be found in U.S. patent application Ser. No. 13/167,701, filed 23 Jun. 2011, which is incorporated by reference. In particular embodiments, the index of multimedia objects may be a post index, wherein each entry of the index of multimedia objects may include a multimedia object (or a link to the multimedia object) and one or more keywords associated with a post, reshare, comment, or message that includes a link to the multimedia object. The social-networking system 160 may identify one or more postsreshares, comments, or messages (rather than multimedia objects) based on matching the one or more n-grams of a search query with the one or more keywords associated with the posts, reshares, comments, or messages. As an example and not by way of limitation, referencing FIGS. 3 and 4, the post 320 and the reshare 420 may be identified by searching a post index that includes entries for the post 320 and the reshare 420. In particular embodiments, the post index may include keywords extracted from the text of posts or reshares, the comments of posts or reshares, the metadata of posts or reshares, messages, or any combination thereof. As an example and not by way of limitation, referencing FIG. 4, a post index's entry for the reshare 420 may include keywords extracted from the text of the comments 430 (e.g., "Cool, is this place in Austin?").

In particular embodiments, the social-networking system 160 may have extracted keywords and keyword phrases from a post, reshare, comment, or message based on a term frequency-inverse document frequency (TF-IDF) analysis of the content of the post, reshare, comment, or message in relation to a set of posts, reshares, comments, or messages. The TF-IDF is a statistical measure used to evaluate how important a word is to a document (e.g., a post) in a collection or corpus (e.g., a set of posts). The importance increases proportionally to the number of times a word appears in a particular document, but is offset by the frequency of the word in the corpus of documents. The importance of a word in a particular document is based in part on the term count in a document, which is simply the number of times a given term (e.g., a word) appears in the document. This count may be normalized to prevent a bias towards longer documents (which may have a higher term count regardless of the actual importance of that term in the document) and to give a measure of the importance of the term t within the particular document d. Thus we have the term frequency tf (t,d), defined in the simplest case as the occurrence count of a term in a document. The inverse-document frequency (idf) is a measure of the general importance of the term which is obtained by dividing the total number of documents by the number of documents containing the term, and then taking the logarithm of that quotient. A high weight in TF-IDF is reached by a high term frequency in the given document and a low document frequency of the term in the whole collection of documents; the weights hence tend to filter out common terms. In particular embodiments, a TF-IDF analysis may be used to determine one or more keywords from the n-grams included in the content of a post, reshare, comment, or message. As an example and not by way of limitation, referencing FIG. 4, a TF-IDF analysis of the text of the reshare 420 may determine that the words (or n-grams) "gary" and "austin" should be extracted as keywords, where these n-grams have high importance within reshare 420. Similarly, a TF-IDF analysis of reshare 420 may determine that the words (or n-grams) "as," "a," and "in" should not be extracted as keywords, where these n-grams have a low importance within the reshare 420 (e.g., because these are common terms in many posts, reshares, comments, or messages). Although this disclosure describes identifying particular objects by searching a particular index in a particular manner, this disclosure contemplates identifying any suitable objects in any suitable manner.

In particular embodiments, the social-networking system 160 may calculate, for each identified multimedia object, an object-score based on one or more social signals (e.g., the number of likes, reshares, or comments). As an example and not by way of limitation, the social-networking system 160 may base the object-score on the number of "likes," reshares, comments, or any combination thereof associated with an identified multimedia object, such that an identified multimedia object with a high number of "likes," reshares, or comments may receive a correspondingly high object-score. The number of likes, reshares, and comments may be measured both globally (e.g., across the entire online social network) and locally (e.g., for a particular post or reshare, or set of posts or reshares). For example, referencing FIGS. 3 and 4, the multimedia object associated with the multimedia-object link 310 may be associated with at least five comments across the entire online social network (e.g., four comments from the comments 330 and one comment from the comments 430). As such, the multimedia object may have a higher object-score than an otherwise identical multimedia object with only four comments. In particular embodiments, the object-score may be a rank and the threshold object-score may be a threshold rank. Although this disclosure describes calculating a particular score for a particular object in a particular manner, this disclosure contemplates employing any suitable scoring mechanism for any suitable object.

In particular embodiments, the object-score may be based on a quality of the match between the one or more n-grams of the search query and the one or more keywords associated with the identified multimedia object. The social-networking system 160 may award a higher object-score for multimedia objects that were identified based on a high-quality match between the n-grams of the search query and the keywords associated with the identified multimedia object. The quality of the match may be based on a match between the topics associated with the n-grams and the topics associated with the keywords. As an example and not by way of limitation, the n-gram "baking" in a search query may be a medium quality match for the keyword "cooking" that may be indexed with a video of a cooking show, if it is determined that they both match the topic "Cooking" or "Baking." The quality of the match may be based on a ratio or number of characters that match each substantially matching keyword. As an example and not by way of limitation, referencing FIG. 3, the social-networking system 160 may determine a high-quality match between the n-gram "commentaries" in a search and the keyword "commentary" from the comments 330 (e.g., "Freaking awesome, esp the commentary") which may have been extracted by the social-networking system 160. The social-networking system 160 may determine the quality of the match based on the edit distance between an n-gram of a search query and a keyword associated with a multimedia object. Edit distance is a way of quantifying how dissimilar two strings (e.g., words) are to one another by counting the minimum number of operations required to transform one string into the other (e.g., the number of characters that need to be changed and the relative position of the characters). As an example and not by way of limitation, the n-gram "john wanye" as inputted into a search query may be a high-quality match for the topic "John Wayne" because only a single operation is required to transform "wanye" into "wayne" (a switch of the characters "n" and "y" in "wanye").

In particular embodiments, the object-score may be based on a relationship within the online social network between the user inputting the search query and an author of a post, reshare, comment, or message corresponding to the identified multimedia object. The social-networking system 160 may access the social graphs to determine relationships among users within the online social network. As an example and not by way of limitation, the social-networking system 160 may calculate a higher object-score for an identified multimedia object that was referenced in a post, reshare, comment, or message by an author who is a first-degree friend of the user on the online social network. As another example and not by way of limitation, the social-networking system 160 may calculate an even higher object-score for an identified multimedia object that was referenced in a post, reshare, comment, or message by an author who is both a first-degree friend and a listed family member of the user or as a partner of the user (e.g., someone listed as being in a relationship with the user) on the online social network.

In particular embodiments, the object-score may be based on whether the author of the post, reshare, comment, or message is identified as a key-author with respect to one or more topics associated with a post, reshare, comment, or message corresponding to the identified multimedia object. In particular embodiments, a key-author for a particular topic may refer to a person who is relevant to, associated with, or knowledgeable about that topic. As an example and not by way of limitation, the actor William Shatner (who acted in the TV show Star Trek) may be a key-author associated with the topic "Star Trek." In particular embodiments, a topic may have multiple key-authors associated with it. As an example and not by way of limitation, each of the members of a rock band may be key-authors associated with the band (e.g., John Lennon, Paul McCartney, George Harrison, and Ringo Starr may each be key-authors associated with the topic "The Beatles"). In particular embodiments, a key-author may be associated with multiple topics. As an example and not by way of limitation, comedian and banjo-player Steve Martin may be a key-author associated with the topic "comedy," and Steve Martin may also be a key-author associated with the topic "banjo." In particular embodiments, a key-author associated with a particular topic may also be a topic. As an example and not by way of limitation, soccer player Lionel Messi may be a key-author associated with the topic "Futbol Club Barcelona," and Lionel Messi himself may also be a topic. As another example and not by way of limitation, First Lady Michelle Obama may be a key-author associated with the topic "Barack Obama," and conversely, President Barack Obama may be a key-author associated with the topic "Michelle Obama." The key-authors may themselves may have an author-score which may be used to determine the effect of a post, reshare, comment, or message by a key-author on the object-score of an identified multimedia object. As an example and not by way of limitation, a multimedia object linked in a post made by a key-author (e.g., a Shakira video posted by Shakira herself) may receive a higher object-score than an identical post by an author who is not a key-author (e.g., a Shakira video posted by the user "Thomas" in FIG. 5A). More information on identifying key-authors and determining author-scores may be found in U.S. patent application Ser. No. 14/554,190, filed 26 Nov. 2014, which is incorporated by reference.

In particular embodiments, the object-score may be based on the current popularity of one or more topics associated with one or more posts, reshares, comments, or messages corresponding to the identified multimedia object as determined by, for example, the number of posts, reshares, views, or likes on the online social network associated with the topic. As an example and not by way of limitation, a topic like "Shakira" (referring to the pop singer) may be popular if Shakira has been a recent topic of discussion on the online social network (e.g., there may be a large number of posts reshares, comments, or messages discussing a new release of a Shakira song). In particular embodiments, the social-networking system 160 may crawl an online index, database, or news source (e.g., WIKIPEDIA.org, BBC.com, CNN.com) to gauge the popularity of a topic. The social-networking system 160 may assign a higher object-score to matches between n-grams and keywords that are associated with a relatively popular topic. As an example and not by way of limitation, upon receiving a user's search query for "marco polo," the social-networking system 160 may initially identify a video associated with the topic "Marco Polo Trailer Park" (a mobile home residential area in Phoenix, Ariz.), a video associated with the topic "Marco Polo (History Channel Documentary)," and a video associated with the topic "Marco Polo (Netflix series)" (a popular TV show on Netflix). Among these videos, the social-networking system 160 may assign the highest object-score to the video associated with "Marco Polo (Netflix series)" if, for example, it determines that there are more posts, reshares, views, or likes associated with that topic. In particular embodiments, social-networking system 160 may gauge the popularity of a topic based on whether the topic is trending on the online social network. The social-networking system may find that a topic is more popular if it is in fact trending on the online social network.

In particular embodiments, the object-score may be based on the number of times the identified multimedia object has been accessed by users of the online social network. As an example and not by way of limitation, the multimedia object referenced by multimedia-object link 310 (i.e., an embedded native video of a user "Gary" performing as a DJ at "Empire Control Room & Garage") may receive a relatively high object-score if it has been accessed many times by users of the online social network. In particular embodiments, the object-score may be based on the number of times the multimedia object has been accessed overall, including the number of times the multimedia object was accessed on a third-party website (e.g., a video distribution/publishing website). As an example and not by way of limitation, referencing FIGS. 5A-5B, the multimedia object referenced by the multimedia-object link 510 (i.e., a music video of Shakira's "Hips Don't Lie") may receive a relatively high object-score because the video has been accessed (e.g., viewed) over 200 million times by users of the video distribution/publishing website.

In particular embodiments, the object-score may be based on a source of the substantially matching keywords associated with the identified multimedia object. If the keywords that substantially match the n-grams of the search query are extracted from a favored source, the object-score of the associated multimedia object may be increased. As an example and not by way of limitation, if the keywords are sourced from the associated text of a reshare, the associated multimedia object may receive a higher object-score. As another example and not by way of limitation, if the keywords are sourced from the associated text of a post, the associated multimedia object may receive a relatively lower object-score. As another example and not by way of limitation, if the keywords are sourced from the title of a video on a video distribution/publishing website, the associated video may receive a higher object-score.

In particular embodiments, the object-score may be based on the level of descriptiveness of the one or more substantially matching keywords. The level of descriptiveness may be determined based on one or more topics associated with the substantially matching keywords. For example, some topics may be deemed by the social-networking system 160 to be more descriptive than others, and multimedia objects associated with substantially matching keywords that are themselves associated with descriptive topics may receive a correspondingly higher object-score. As an example and not by way of limitation, referencing FIG. 3, "loll" (a misspelling of the acronym "lol" for "laugh out loud") and "haha" may be extracted keywords from the comments 330. Both keywords may be associated with the topic "LOL," which the social-networking system 160 may have deemed to be less descriptive. Accordingly, the object-score for a multimedia object that was identified solely because of a substantial match with keywords associated with the topic "LOL" (e.g., "loll" and "haha") may be decreased.

In particular embodiments, the object-score may be increased or decreased based on advertising sponsorship (e.g., a producer of a new movie may pay to increase the object-score of the movie's trailer).

In particular embodiments, the social-networking system 160 may calculate a post-score for posts or reshares. The post-score may be based on the same factors that constitute the basis for the object-scores of identified multimedia objects (described above). For example, the post-score of a post or reshare may be based on one or more social signals associated with the post or reshare (e.g., the number of likes, reshares, or comments associated with the post or reshare). As another example, the post-score of a post or reshare may be based on a relationship within the online social network between the user sending the search query and the author of the post or reshare. As another example, the post-score of a post or reshare may be based on the quality of the match between the n-grams of a user's search query and the keywords associated with the post or reshare (e.g., keywords associated with the text of the post or reshare) that may be determined by accessing a post index. As an example and not by way of limitation, referencing FIGS. 5A-5B, in response to a user's search query for "jb 2006 hips don't lie," the social-networking system 160 may calculate a higher post-score for the reshare 521 (e.g., because the reshare 521 contains the keywords "2006" and "jb," while the post 520 does not). In particular embodiments, the social-networking system 160 may calculate scores for comments or messages in an analogous manner, calculating, for example, a comment-score or a message-score. In particular embodiments, a message-score will only be calculated for messages for which the user submitting the search query has access (e.g., messages sent by or received by the user).

In particular embodiments, the social-networking system 160 may generate one or more search results corresponding to one or more of the identified multimedia objects, respectively. Each search result may include a reference to a corresponding identified multimedia object having an object-score greater than a threshold object-score. As an example and not by way of limitation, referencing FIGS. 5A-5B, the social-networking system 160 may, in response to a user search query for "shakira hips don't lie," generate a search result with the Shakira video referenced by the multimedia-object link 510 (which may have an object-score greater than the threshold object-score) but not a search result with a video about hip replacement surgery (which may have an object-score less than the threshold object-score). A search result may be a post or reshare including a link to a corresponding identified multimedia object or simply the link itself. The search-results page may include search results that are posts or reshares including one or more links, links by themselves, or any combination thereof. In particular embodiments, the social-networking system 160 may, when choosing among posts or reshares referencing the same multimedia objects (e.g., posts or reshares with the same URL for a sound clip of a particular sound recording copy) or substantially same multimedia objects (e.g., posts or reshares with different URLs directed to different copies of a particular sound recording), generate as search results only posts or reshares having a post-score greater than a threshold post-score. As an example and not by way of limitation, referencing FIGS. 5A-5B, in response to a user's search query for "jb 2006 hips don't lie," the social-networking system 160 may, upon determining that both the post 520 and the reshare 521 link to the same multimedia object (e.g., by determining that they both include the same multimedia-object link 510), generate the reshare 521 as a search result but not the post 520 if the post 520 does not have a post-score greater than a pre-determined threshold post-score (e.g., because the post 520 does not include the keywords "jb" and "2006"). In particular embodiments, the post-score may be a post-rank and the threshold post-score may be a threshold post-rank. Just as with the object-score of an identified multimedia object, the post-score of a post or reshare may be increased or decreased based on advertising sponsorship (e.g., referencing FIG. 3, the author of the post 320 may sponsor the post to increase its post-score). Although this disclosure describes generating particular search results in a particular manner, this disclosure contemplates generating any suitable search results in any suitable manner. As an example and not by way of limitation, a search result may be a message or a comment comprising links to multimedia objects, generated in an analogous manner as to the manner described above.

In particular embodiments, the social-networking system 160 may send, responsive to the search query, a search-results page to the client system 130 of the user for display. The search-results page may include one or more of the generated search results (e.g., a link to an audio clip on an audio distribution/publishing website, a post/reshare/comment/message that includes a link to a video on a video distribution/publishing website, and an embedded native video object). The search-results page may be a page of the online social network. In particular embodiments, the social-networking system 160 may deduplicate search results by not displaying search results referencing the same multimedia object. As an example and not by way of limitation, the social-networking system 160 may determine that several search results included the same link to a particular Shakira video (e.g., the post 520 and the reshare 521) and may determine to not display at least some of the search results (e.g., based on the associated post-scores). In particular embodiments, the social-networking system 160 may further deduplicate search results by not displaying search results with references to substantially same multimedia objects. As an example and not by way of limitation, there may be several instances of a music video of Shakira's "Hips Don't Lie" (e.g., the same video may have several copies of itself hosted on a video distribution/publishing website, or on several video distribution/publishing websites), all of which may be generated as search results. The social-networking system 160 may determine to not display at least some of those search results to the user based on the object-score of the particular copies of the referenced multimedia objects. In particular embodiments, the search results of the search-results page are presented in an order based on the object-scores of the identified multimedia objects corresponding to the search results. As an example and not by way of limitation, the social-networking system 160 may order the search results by their object-scores in descending order. In particular embodiments, the social-networking system 160 may use the post-score to further order the search results. As an example and not by way of limitation, the social-networking system 160 may present a search result that is a post or reshare by a user's friend on the online social network before (or above) a search result that is a post or reshare by a user who is not a friend of the user on the online social network. Although this disclosure describes sending particular search results to a particular system of the user in a particular manner, this disclosure contemplates sending any suitable search results to any suitable system or device of the user in any suitable manner.

FIGS. 6A-6C illustrate example indexes of multimedia objects. In particular embodiments, the social-networking system 160 may index a post or reshare that includes a link to a multimedia object in a post index. The social-networking system 160 may first receive a post or reshare that includes one or more links to one or more multimedia objects and associated text. The associated text may include text from the content of the post or reshare, text from associated comments, text from associated metadata. The social-networking system 160 may access a post index such as the one represented by FIG. 6A. The post index may be a forward index of a data store corresponding to posts or reshares. The social-networking system 160 may extract one or more keywords from the associated text of the post or reshare. The social-networking system 160 may then index the post or reshare by a post ID (i.e., a unique ID generated by the social-networking system 160 for each post or reshare) in an index entry of the post index. As an example and not by way of limitation, referencing FIG. 6A, Post 1, Post 2, and Post 3 may be indexed by their respective post IDs. The index entry may include the linked multimedia objects (or the links to the multimedia object, e.g., a URL) and one or more extracted keywords (e.g., the keywords k1, k2, and k3). The index entry may also include the global and local social signal counts associated with the respective multimedia objects, and the local social signal counts of the post or reshare. As an example and not by way of limitation, referencing FIG. 6A, the index entry for Post 1 may include the number of associated likes, reshares, and comments. The social signal counts may be associated with Post 1, the multimedia object referenced by Link 1, or both. As an example and not by way of limitation, referencing FIGS. 3 and 4, the reshare 420 may be indexed by a post ID in an index entry with the multimedia-object link 310, keywords from the associated text (e.g., "gary," "Empire Control Room & Garage"), the global social signal counts of the referenced multimedia object (e.g., one reshare, five likes), and the local social signal counts of the reshare 420 (e.g., one comment, zero likes). In particular embodiments, the social-networking system 160 may further extract keywords from textual information associated with a post or reshare as found on the social graph 200. In doing so, the social-networking system 160 may look at user nodes and concept nodes to which a keyword in the post or reshare may be directed. As an example and not by way of limitation, referencing FIG. 4, the social-networking system 160 may identify a user node that corresponds to the keyword "gary" if, for example, the author of the reshare 420 (e.g., "Thomas") had "tagged" a user (e.g., "Gary") of the online social network to the text "gary." The social-networking system 160 may then index the user node associated with "gary," nodes associated with the user node, and keywords extracted from information associated with the user node (e.g., a band name or DJ name associated with the user "Gary"). In particular embodiments, the social-networking system 160 may, upon receiving a post or reshare that includes a link to a multimedia object, access a multimedia index such as the one represented by FIG. 6B. The multimedia index may be an inverted index of a data store corresponding to posts or reshares. The social-networking system 160 may extract one or more keywords from the associated text of the post or reshare. The social-networking system 160 may index, in an index entry, a linked multimedia object (or the link to the multimedia object) by a multimedia ID unique to each multimedia object (or by a link ID unique to each link to a multimedia object). As an example and not by way of limitation, referencing FIG. 6B, Link 1, Link 2, and Link 3 may be indexed by their respective link IDs. The index entry may include one or more posts or reshares associated with the link (e.g., Post 1 associated with Link 1), one or more extracted keywords from the associated text of one or more posts or reshares associated with the link (e.g., k1, k2, and k3), the global and local social signal counts of the multimedia object, and the local social signal counts of the post or reshare. In particular embodiments, the social-networking system 160 may index a multimedia object (or a link to the multimedia object) by an extracted keyword from the text associated with one or more posts or reshares that include a link to the multimedia object (e.g., blurbs and titles associated with the multimedia object). The social-networking system 160 may access a keyword index such as the one represented by FIG. 6C. The keyword index may be an inverted index of a data store corresponding to posts or reshares. The social-networking system 160 may extract keywords from the associated text of posts or reshares on the online social network and create index entries for each extracted keyword. Each index entry may include one or more multimedia objects (or links to the multimedia objects) associated with the keyword, the global and local social signal counts of the multimedia object, and the local social signal counts of the post or reshare. In particular embodiments, the elements within an index entry of multimedia objects may be indexed under separate subentries. As an example and not by way of limitation, referencing the keyword index of FIG. 6C, subentries may be created for keywords k1 and k2, with each subentry corresponding to Link 1 and Link 2. This may have resulted from posts or reshares including multimedia-object links Link 1 and Link 2 also including the keywords k1 and k2. Further subentries may be created for the posts or reshares if there are multiple posts or reshares referencing a particular link (e.g., Post 1 and Post 3 both refer to Link 1 within the k2 index entry). Having such subentries in the index may allow the social-networking system 160 to, for example, better discriminate among between Link 1 and Link 2 when it is the case that k1 matches an n-gram of the search query (e.g., by considering the social signal counts of each link individually). As an example and not by way of limitation, referencing FIG. 6C, upon determining a match between an n-gram of the search query and the keyword k1, the social-networking system may choose to display Link 1 rather than Link 2 based on the fact that Link 1 has one more reshare than Link 2. The same type of result may be achieved for other indexes (e.g., a post index or a multimedia index). Although this disclosure describes indexing particular items in a particular manner, this disclosure contemplates indexing any suitable items in any suitable manner. As an example and not by way of limitation, a message index may index messages comprising links to multimedia objects in an analogous manner, the index being customized for the user submitting the search query (e.g., indexing messages for which the user has access, such as those messages sent or received by the user). As another example and not by way of limitation, message index may index messages comprising links to multimedia objects in an analogous manner, the index not being customized for any particular user (e.g., indexing all messages in the social-networking system 160). As another example and not by way of limitation, a comment index may index comments comprising links to multimedia objects in an analogous manner.

Figure 7:
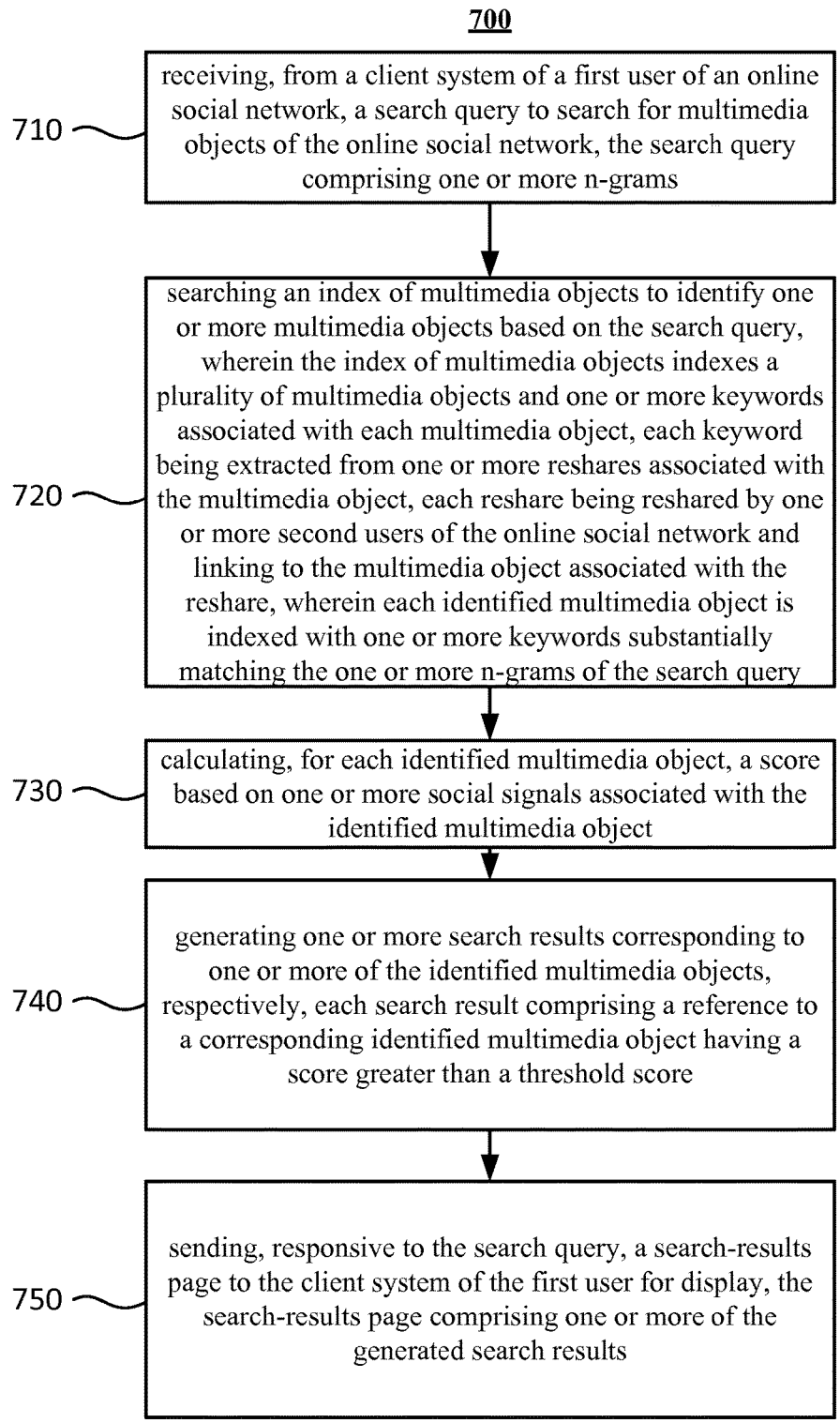
FIG. 7 illustrates an example method for identifying multimedia objects based on a search query.

FIG. 7 illustrates an example method 700 for identifying multimedia objects based on a search query. The method may begin at step 710, where the social-networking system 160 may receive, from a client system 130 of a first user of an online social network, a search query to search for multimedia objects of the online social network. The search query may include one or more n-grams. At step 720, the social-networking system 160 may search an index of multimedia objects to identify one or more multimedia objects based on the search query, wherein the index of multimedia objects indexes a plurality of multimedia objects and one or more keywords associated with each multimedia object. Each of the keywords may be extracted from one or more reshares associated with the multimedia object. Each of the reshares may be reshared by one or more second users of the online social network and may link to the multimedia object associated with the reshare, wherein each identified multimedia object is indexed with one or more keywords substantially matching the one or more n-grams of the search query. At step 730, the social-networking system 160 may calculate, for each identified multimedia object, an object-score based on one or more social signals. At step 740, the social-networking system 160 may generate one or more search results corresponding to one or more of the identified multimedia objects, respectively. Each search result may comprise a reference to a corresponding identified multimedia object having an object-score greater than a threshold object-score. At step 750, the social-networking system 160 may send, responsive to the search query, a search-results page to the client system 130 of the first user for display. The search-results page may include one or more of the generated search results. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for identifying multimedia objects based on a search query including the particular steps of the method of FIG. 7, this disclosure contemplates any suitable method for identifying multimedia objects based on a search query including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Social Graph Affinity and Coefficient

In particular embodiments, the social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the social-networking system 160 may calculate a coefficient based on a user's actions. The social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, the social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. The social-networking system 160 may analyze a user's actions to determine whether one or more of the actions indicate an affinity for subject matter, content, other users, and so forth. As an example and not by way of limitation, if a user may make frequently posts content related to "coffee" or variants thereof, the social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, the social-networking system 160 may calculate a coefficient based on the type of relationship between particular objects. Referencing the social graph 200, the social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, the social-networking system 160 may determine that the user has a higher coefficient with respect to the first photo than the second photo because having a tagged-in-type relationship with content may be assigned a higher weight and/or rating than having a like-type relationship with content. In particular embodiments, the social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, the social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, the social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, the social-networking system 160 may determine that the user has a higher coefficient for the airport than the gas station based on the proximity of the airport to the user.

In particular embodiments, the social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the social-networking system 160 may provide information that is relevant to user's interests and current circumstances, increasing the likelihood that they will find such information of interest. In particular embodiments, the social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, the social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, the social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, the social-networking system 160 may calculate the coefficient (or access the coefficient information if it has previously been calculated and stored). In particular embodiments, the social-networking system 160 may measure an affinity with respect to a particular process. Different processes (both internal and external to the online social network) may request a coefficient for a particular object or set of objects. The social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No.

11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Advertising

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, the social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 160) or RSVP (e.g., through social-networking system 160) to an event associated with the advertisement. In addition or as an alternative, an advertisement may include social-networking-system context directed to the user. As an example and not by way of limitation, an advertisement may display information about a friend of the user within the social-networking system 160 who has taken an action associated with the subject matter of the advertisement.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by the social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 8:
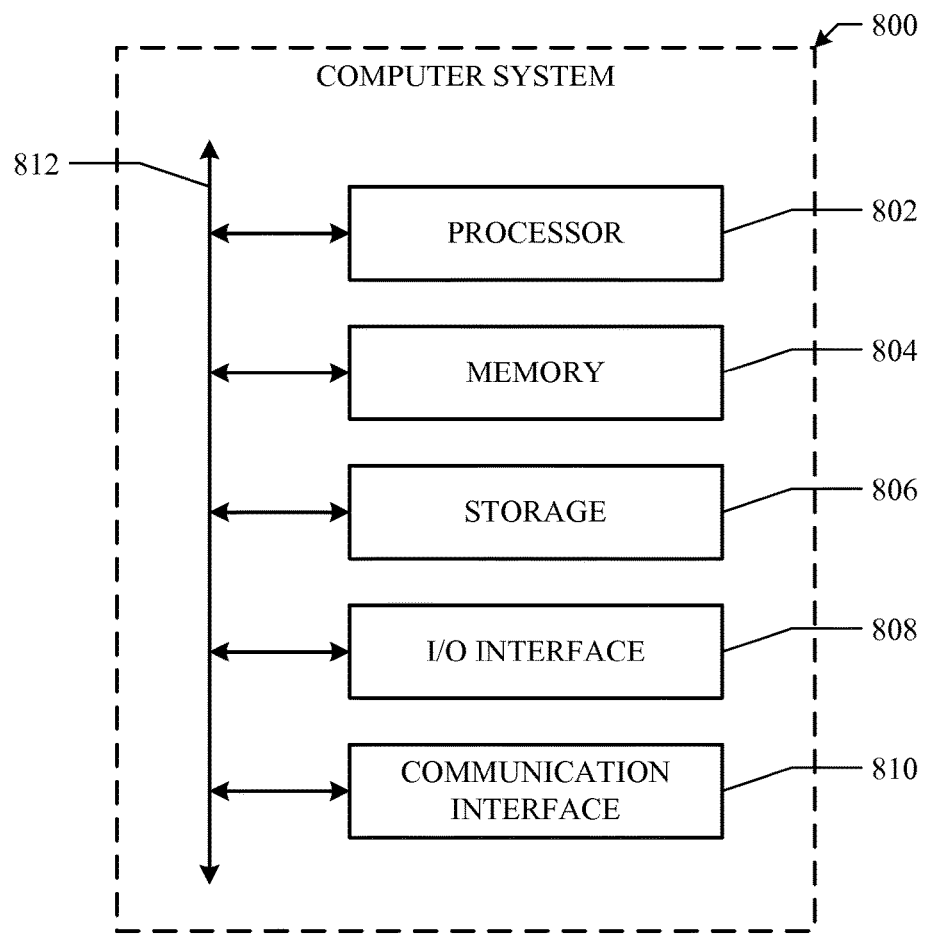
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing devices:
    receiving, by the one or more computing devices from a client system of a first user of an online social network, a search query to search for multimedia objects of the online social network, the search query comprising one or more n-grams;
    searching, by the one or more computing devices, an index of multimedia objects to identify one or more multimedia objects based on the search query, wherein the index of multimedia objects indexes a plurality of multimedia objects and one or more keywords associated with each multimedia object, each keyword being extracted from one or more communications associated with the multimedia object, wherein each communication is of a particular communication-type of a plurality of communication-types, and wherein each communication is sent by one or more second users of the online social network and links to the multimedia object associated with the communication, wherein each identified multimedia object is indexed with one or more keywords matching at least a portion of the one or more n-grams of the search query;
    calculating, by the one or more computing devices, for each identified multimedia object, an object-score based on: (1) one or more social signals associated with the identified multimedia object, (2) whether an author of a communication associated with the identified multimedia object is identified as a key-author determined to be relevant to or knowledgeable about one or more topics associated with the communication, and (3) a communication-type of a communication from which one or more of the matching keywords were sourced, wherein:
        if the communication is of a post-communication-type, a first weight is applied to the matching keywords, and
        if the communication is of a reshare-communication-type, a second weight is applied to the matching keywords, wherein the second weight is greater than the first weight;
    generating, by the one or more computing devices, one or more search results corresponding to one or more of the identified multimedia objects, respectively, each search result comprising a reference to a corresponding identified multimedia object having an object-score greater than a threshold object-score; and
    sending, by the one or more computing devices, responsive to the search query, a search-results page to the client system of the first user for display, the search-results page comprising one or more of the generated search results.

2. The method of claim 1, further comprising:
    accessing a social graph comprising a plurality of nodes and a plurality of edges connecting the nodes, each of the edges between two of the nodes representing a single degree of separation between them, the nodes comprising:
        a first node corresponding to the first user; and
        a plurality of user nodes corresponding to a plurality of second users of the online social network, respectively; and
        a plurality of concept nodes corresponding to a plurality of communications of the online social network, each communication linking to a multimedia object of the online social network.

3. The method of claim 1, wherein searching the index of multimedia objects to identify one or more multimedia objects based on the search query comprises:
    accessing the index of multimedia objects, the index of multimedia objects comprising a plurality of entries, each entry comprising a link to a multimedia object and one or more keywords extracted from a post, reshare, comment, or message comprising a link to the multimedia object;
    identifying one or more posts, reshares, comments, or messages linking to one or more multimedia objects based on matching the one or more n-grams of the search query with the one or more keywords extracted from the identified one or more posts, reshares, comments, or messages; and
    identifying the one or more multimedia objects linked by the one or more posts, reshares, comments, or messages.

4. The method of claim 1, wherein the object-score is further based on a quality of the match between the one or more n-grams of the search query and the one or more keywords associated with the identified multimedia object.

5. The method of claim 1, wherein the object-score is further based on a relationship within the online social network between the first user and an author of a communication corresponding to the identified multimedia object.

6. The method of claim 1, wherein the object-score is further based on a current popularity of one or more topics associated with one or more communications corresponding to the identified multimedia object.

7. The method of claim 1, wherein the object-score is further based on a number of times the identified multimedia object has been accessed by users of the online social network.

8. The method of claim 1, wherein the search results of the search-results page are presented in an order based on the object-scores of the identified multimedia objects corresponding to the search results.

9. The method of claim 8, wherein the order is further based on a post-score of a post or reshare, the post-score being based on one or more social signals.

10. The method of claim 9, wherein the post-score is further based on a relationship within the online social network between the first user and an author of the post or reshare.

11. The method of claim 1, wherein the one or more keywords associated with each multimedia object further comprise keywords extracted from one or more comments associated with a reshare associated with the multimedia object.

12. The method of claim 1, wherein the one or more keywords associated with each multimedia object further comprise keywords extracted from one or more comments associated with a post associated with the multimedia object.

13. The method of claim 1, wherein the one or more keywords associated with each multimedia object have been extracted from the communications associated with the multimedia object based on a TF-IDF analysis.

14. The method of claim 1, further comprising:
receiving a first post or reshare comprising a link to a multimedia object and associated text;
accessing a post index, wherein the post index is a forward index;
extracting one or more keywords from the associated text of the first post or reshare; and
indexing the first post or reshare by a post ID in an index entry, the index entry comprising the link and the one or more extracted keywords from the associated text of the first post or reshare.

15. The method of claim 1, further comprising:
receiving a first post or reshare comprising a link to a multimedia object and associated text;
accessing a multimedia index, wherein the multimedia index is an inverted index;
extracting one or more keywords from the associated text of the first post or reshare; and
indexing the link by a link ID in an index entry, the index entry further comprising one or more posts or reshares associated with the link and one or more extracted keywords from associated text of one or more posts or reshares associated with the link.

16. The method of claim 1, further comprising:
receiving a first post or reshare comprising a link to a multimedia object and associated text;
accessing a keyword index, wherein the keyword index is an inverted index;
extracting one or more keywords from the associated text of the first post or reshare; and
indexing the link by an extracted keyword from associated text of one or more posts or reshares associated with the link in an index entry, the index entry further comprising one or more links to one or more multimedia objects associated with the keyword.

17. The method of claim 1, wherein the search query is received by the one or more computing devices following input of the search query into a query field of an interface being displayed on the client system of the first user, wherein the interface is associated with the online social network.

18. One or more computer-readable non-transitory storage media embodying software that is operable when executed to:
receive, by one or more computing devices from a client system of a first user of an online social network, a search query to search for multimedia objects of the online social network, the search query comprising one or more n-grams;
search, by the one or more computing devices, an index of multimedia objects to identify one or more multimedia objects based on the search query, wherein the index of multimedia objects indexes a plurality of multimedia objects and one or more keywords associated with each multimedia object, each keyword being extracted from one or more communications associated with the multimedia object, wherein each communication is of a particular communication-type of a plurality of communication-types, and wherein each communication is sent by one or more second users of the online social network and links to the multimedia object associated with the communication, wherein each identified multimedia object is indexed with one or more keywords matching at least a portion of the one or more n-grams of the search query;
calculate, by the one or more computing devices, for each identified multimedia object, an object-score based on: (1) one or more social signals associated with the identified multimedia object, (2) whether an author of a communication associated with the identified multimedia object is identified as a key-author determined to be relevant to or knowledgeable about one or more topics associated with the communication, and (3) a communication-type of a communication from which one or more of the matching keywords were sourced, wherein:
if the communication is of a post-communication-type, a first weight is applied to the matching keywords, and
if the communication is of a reshare-communication-type, a second weight is applied to the matching keywords, wherein the second weight is greater than the first weight;
generate, by the one or more computing devices, one or more search results corresponding to one or more of the identified multimedia objects, respectively, each search result comprising a reference to the corresponding identified multimedia object having an object-score greater than a threshold object-score; and
send, by the one or more computing devices, responsive to the search query, a search-results page to the client system of the first user for display, the search-results page comprising one or more of the generated search results.

19. The media of claim 18, wherein the software is further operable when executed to:
access a social graph comprising a plurality of nodes and a plurality of edges connecting the nodes, each of the edges between two of the nodes representing a single degree of separation between them, the nodes comprising:
a first node corresponding to the first user; and
a plurality of user nodes corresponding to a plurality of second users of the online social network, respectively; and
a plurality of concept nodes corresponding to a plurality of communications of the online social network, each communication linking to a multimedia object of the online social network.

20. The media of claim 18, wherein the software when executed to search the index of multimedia objects to identify one or more multimedia objects based on the search query is further operable when executed to:
access the index of multimedia objects, the index of multimedia objects comprising a plurality of entries, each entry comprising a link to a multimedia object and one or more keywords extracted from a post, reshare, comment, or message comprising a link to the multimedia object;
identify one or more posts, reshares, comments, or messages linking to one or more multimedia objects based on matching the one or more n-grams of the search query with the one or more keywords extracted from the identified one or more posts, reshares, comments, or messages; and
identify the one or more multimedia objects linked by the one or more posts, reshares, comments, or messages.

21. The media of claim 18, wherein the object-score is further based on a quality of the match between the one or more n-grams of the search query and the one or more keywords associated with the identified multimedia object.

22. The media of claim 18, wherein the object-score is further based on a relationship within the online social network between the first user and an author of a communication corresponding to the identified multimedia object.

23. The media of claim 18, wherein the object-score is further based on a current popularity of one or more topics associated with one or more communications corresponding to the identified multimedia object.

24. The media of claim 18, wherein the object-score is further based on a number of times the identified multimedia object has been accessed by users of the online social network.

25. The media of claim 18, wherein the search results of the search-results page are presented in an order based on the object-scores of the identified multimedia objects corresponding to the search results.

26. The media of claim 25, wherein the order is further based on a post-score of a post or reshare, the post-score being based on one or more social signals.

27. The media of claim 26, wherein the post-score is further based on a relationship within the online social network between the first user and an author of the post or reshare.

28. The media of claim 18, wherein the one or more keywords associated with each multimedia object further comprise keywords extracted from one or more comments associated with a reshare associated with the multimedia object.

29. The media of claim 18, wherein the one or more keywords associated with each multimedia object further comprise keywords extracted from one or more comments associated with a post associated with the multimedia object.

30. The media of claim 18, wherein the one or more keywords associated with each multimedia object have been extracted from the communications associated with the multimedia object based on a TF-IDF analysis.

31. The media of claim 18, the software is further operable when executed to:
receive a first post or reshare comprising a link to a multimedia object and associated text;
access a post index, wherein the post index is a forward index;
extract one or more keywords from the associated text of the first post or reshare; and
index the first post or reshare by a post ID in an index entry, the index entry comprising the link and the one or more extracted keywords from the associated text of the first post or reshare.

32. The media of claim 18, the software is further operable when executed to:
receive a first post or reshare comprising a link to a multimedia object and associated text;
access a multimedia index, wherein the multimedia index is an inverted index;
extract one or more keywords from the associated text of the first post or reshare; and
index the link by a link ID in an index entry, the index entry further comprising one or more posts or reshares associated with the link and one or more extracted keywords from associated text of one or more posts or reshares associated with the link.

33. The media of claim 18, further comprising:
receive a first post or reshare comprising a link to a multimedia object and associated text;
access a keyword index, wherein the keyword index is an inverted index;
extract one or more keywords from the associated text of the first post or reshare; and
index the link by an extracted keyword from associated text of one or more posts or reshares associated with the link in an index entry, the index entry further comprising one or more links to one or more multimedia objects associated with the keyword.

34. A system comprising: one or more processors; and a non-transitory memory coupled to the processors comprising instructions executable by the processors, the processors operable when executing the instructions to:
receive, by one or more of the processors from a client system of a first user of an online social network, a search query to search for multimedia objects of the online social network, the search query comprising one or more n-grams;
search, by one or more of the processors, an index of multimedia objects to identify one or more multimedia objects based on the search query, wherein the index of multimedia objects indexes a plurality of multimedia objects and one or more keywords associated with each multimedia object, each keyword being extracted from one or more communications associated with the multimedia object, wherein each communication is of a particular communication-type of a plurality of communication-types, and wherein each communication is sent by one or more second users of the online social network and links to the multimedia object associated with the communication, wherein each identified multimedia object is indexed with one or more keywords matching at least a portion of the one or more n-grams of the search query;
calculate, by one or more of the processors, for each identified multimedia object, an object-score based on: (1) one or more social signals associated with the identified multimedia object, (2) whether an author of a communication associated with the identified multimedia object is identified as a key-author determined to be relevant to or knowledgeable about one or more topics associated with the communication, and (3) a communication-type of a communication from which one or more of the matching keywords were sourced, wherein:
if the communication is of a post-communication-type, a first weight is applied to the matching keywords, and
if the communication is of a reshare-communication-type, a second weight is applied to the matching keywords, wherein the second weight is greater than the first weight;
generate, by one or more of the processors, one or more search results corresponding to one or more of the identified multimedia objects, respectively, each search result comprising a reference to the corresponding identified multimedia object having an object-score greater than a threshold object-score; and send, by one or more of the processors, responsive to the search query, a search-results page to the client system of the first user for display, the search-results page comprising one or more of the generated search results.

* * * * *